(12) United States Patent
Menon et al.

(10) Patent No.: US 7,187,709 B1
(45) Date of Patent: Mar. 6, 2007

(54) HIGH SPEED CONFIGURABLE TRANSCEIVER ARCHITECTURE

(75) Inventors: Suresh M. Menon, Sunnyvale, CA (US); Atul V. Ghia, San Jose, CA (US); Warren E. Cory, Redwood City, CA (US); Paul T. Sasaki, Sunnyvale, CA (US); Philip M. Freidin, Sunnyvale, CA (US); Santiago G. Asuncion, San Jose, CA (US); Philip D. Costello, San Jose, CA (US); Vasisht M. Vadi, Mountain View, CA (US); Adebabay M. Bekele, San Jose, CA (US); Hare K. Verma, Cupertino, CA (US)

(73) Assignee: Xilinx, Inc., San Jose, CA (US)

( * ) Notice: Subject to any disclaimer, the term of this patent is extended or adjusted under 35 U.S.C. 154(b) by 872 days.

(21) Appl. No.: 10/090,250

(22) Filed: Mar. 1, 2002

(51) Int. Cl.
   *H04B 1/38* (2006.01)
   *H04L 5/16* (2006.01)
(52) U.S. Cl. ............... 375/219; 375/222; 341/100; 326/38; 326/39; 326/41; 326/47
(58) Field of Classification Search ............ 375/219, 375/222; 326/39, 38, 41, 47; 341/100
   See application file for complete search history.

(56) References Cited

U.S. PATENT DOCUMENTS

| | | | |
|---|---|---|---|
| 4,366,478 A | * | 12/1982 | Masuda et al. ............ 340/825 |
| 4,758,985 A | | 7/1988 | Carter |
| 4,855,669 A | | 8/1989 | Mahoney |
| 5,072,418 A | | 12/1991 | Boutaud et al. |
| 5,142,625 A | | 8/1992 | Nakai |
| RE34,363 E | | 8/1993 | Freeman |
| 5,274,570 A | | 12/1993 | Izumi et al. |
| 5,311,114 A | | 5/1994 | Sambamurthy et al. |
| 5,339,262 A | | 8/1994 | Rostoker et al. |

(Continued)

FOREIGN PATENT DOCUMENTS

EP    0315275 A2    10/1989

(Continued)

OTHER PUBLICATIONS

IBM; "Mixture of Field and Factory Programed Logic Cells in a Single Device"; IBM Technical Disclosure Bulletin; vol. 38, No. 4; Apr. 1995; pp. 499.

(Continued)

*Primary Examiner*—Chieh M. Fan
*Assistant Examiner*—Ted M. Wang
(74) *Attorney, Agent, or Firm*—H. C. Chan; LeRoy D. Maunu

(57) ABSTRACT

One or more configurable transceivers can be fabricated on an integrated circuit. The transceivers contain various components having options that can be configured by turning configuration memory cells on or off. The integrated circuit may also contain programmable fabric. Other components in the transceivers can have options that are controlled by the programmable fabric. The integrated circuit may also contain one or more processor cores. The processor core and the transceivers can be connected by a plurality of signal paths that pass through the programmable fabric.

17 Claims, 3 Drawing Sheets

U.S. PATENT DOCUMENTS

| | | |
|---|---|---|
| 5,347,181 A | 9/1994 | Ashby et al. |
| 5,361,373 A | 11/1994 | Gilson |
| 5,457,410 A | 10/1995 | Ting |
| 5,473,267 A | 12/1995 | Stansfield |
| 5,500,943 A | 3/1996 | Ho et al. |
| 5,504,738 A | 4/1996 | Sambamurthy et al. |
| 5,537,601 A | 7/1996 | Kimura et al. |
| 5,543,640 A | 8/1996 | Sutherland et al. |
| 5,550,782 A | 8/1996 | Cliff et al. |
| 5,552,722 A | 9/1996 | Kean |
| 5,574,930 A | 11/1996 | Halverson, Jr. et al. |
| 5,574,942 A | 11/1996 | Colwell et al. |
| 5,581,745 A | 12/1996 | Muraoka |
| 5,594,367 A * | 1/1997 | Trimberger et al. .......... 326/41 |
| 5,600,845 A | 2/1997 | Gilson |
| 5,652,904 A | 7/1997 | Trimberger |
| 5,671,355 A | 9/1997 | Collins |
| 5,701,091 A * | 12/1997 | Kean ........................... 326/41 |
| 5,705,938 A | 1/1998 | Kean |
| 5,732,250 A | 3/1998 | Bates et al. |
| 5,737,631 A | 4/1998 | Trimberger |
| 5,740,404 A | 4/1998 | Baji |
| 5,742,179 A | 4/1998 | Sasaki |
| 5,742,180 A | 4/1998 | DeHon et al. |
| 5,748,979 A | 5/1998 | Trimberger |
| 5,752,035 A | 5/1998 | Trimberger |
| 5,760,607 A | 6/1998 | Leeds et al. |
| 5,809,517 A | 9/1998 | Shimura |
| 5,835,405 A | 11/1998 | Tsui et al. |
| 5,872,920 A * | 2/1999 | Hausman et al. ........... 709/250 |
| 5,874,834 A | 2/1999 | New |
| 5,889,788 A | 3/1999 | Pressly et al. |
| 5,892,961 A | 4/1999 | Trimberger |
| 5,907,566 A | 5/1999 | Benson et al. |
| 5,914,616 A | 6/1999 | Young et al. |
| 5,914,902 A | 6/1999 | Lawrence et al. |
| 5,933,023 A | 8/1999 | Young |
| 5,970,254 A | 10/1999 | Cooke et al. |
| 6,011,407 A | 1/2000 | New |
| 6,020,755 A | 2/2000 | Andrews et al. |
| 6,026,481 A | 2/2000 | New et al. |
| 6,091,962 A * | 7/2000 | Bonta ......................... 455/502 |
| 6,096,091 A | 8/2000 | Hartmann |
| 6,115,763 A * | 9/2000 | Douskey et al. .............. 710/72 |
| 6,150,837 A | 11/2000 | Beal et al. |
| 6,154,051 A | 11/2000 | Nguyen et al. |
| 6,163,166 A | 12/2000 | Bielby et al. |
| 6,172,990 B1 | 1/2001 | Deb et al. |
| 6,178,541 B1 | 1/2001 | Joly et al. |
| 6,181,163 B1 | 1/2001 | Agrawal et al. |
| 6,211,697 B1 | 4/2001 | Lien et al. |
| 6,237,124 B1 * | 5/2001 | Plants ........................ 714/763 |
| 6,242,945 B1 | 6/2001 | New |
| 6,272,451 B1 | 8/2001 | Mason et al. |
| 6,279,045 B1 | 8/2001 | Muthujumaraswathy et al. |
| 6,282,627 B1 | 8/2001 | Wong et al. |
| 6,301,696 B1 | 10/2001 | Lien et al. |
| 6,343,207 B1 | 1/2002 | Hessel et al. |
| 6,353,331 B1 | 3/2002 | Shimanek |
| 6,356,987 B1 | 3/2002 | Aulas |
| 6,389,558 B1 | 5/2002 | Herrmann et al. |
| 6,434,735 B1 | 8/2002 | Watkins |
| 6,460,172 B1 | 10/2002 | Insenser Farre et al. |
| 6,467,009 B1 | 10/2002 | Winegarden et al. |
| 6,483,342 B2 | 11/2002 | Britton et al. |
| 6,507,942 B1 | 1/2003 | Calderone et al. |
| 6,510,548 B1 | 1/2003 | Squires |
| 6,518,787 B1 | 2/2003 | Allegrucci et al. |
| 6,519,753 B1 | 2/2003 | Ang et al. |
| 6,522,167 B1 | 2/2003 | Ansari et al. |
| 6,539,508 B1 | 3/2003 | Patrie et al. |
| 6,541,991 B1 | 4/2003 | Hornchek et al. |
| 6,578,174 B2 | 6/2003 | Zizzo |
| 6,587,995 B1 | 7/2003 | Duboc et al. |
| 6,588,006 B1 | 7/2003 | Watkins |
| 6,594,275 B1 * | 7/2003 | Schneider ................... 370/465 |
| 6,601,227 B1 | 7/2003 | Trimberger |
| 6,604,228 B1 | 8/2003 | Patel et al. |
| 6,611,951 B1 | 8/2003 | Tetelbaum et al. |
| 6,798,239 B2 * | 9/2004 | Douglass et al. ............. 326/39 |
| 7,068,650 B1 * | 6/2006 | Bachar et al. .............. 370/380 |
| 2001/0049813 A1 | 12/2001 | Chan et al. |
| 2003/0062922 A1 | 4/2003 | Douglass et al. |

FOREIGN PATENT DOCUMENTS

| | | |
|---|---|---|
| EP | 0 905 906 A2 | 3/1999 |
| EP | 1 235 351 A1 | 8/2002 |
| WO | WO 93 25968 A1 | 12/1993 |

OTHER PUBLICATIONS

Agere Systems; "ORCA ORT8850 Field-Programmable System Chip (FPSC) Eight-Channel x 850 Mbits/s Backplane Transceiver"; Data Sheet; Aug. 2001; XP002292334 Retrieved from the Internet; URL: http://alldatasheet.co.kr/datasheet-pdf/pdf/pdf_kor/AGERE/ORT8850.html>; pp. 1-54.

U.S. Appl. No. 10/082,490, filed Feb. 22, 2002, Cory.

Sayfe Kiaei et al., "VLSI Design of Dynamically Reconfigurable Array Processor-Drap," IEEE, Feb. 1989, pp. 2484-2488, V3.6, IEEE, 3 Park Avenue, 17th Floor, New York, NY 10016-5997.

Vason P. Srini, "Field Programmable Gate Array (FPGA) Implementation of Digital Systems: An Alternative to Asic," IEEE, May 1991, pp. 309-314, IEEE, 3 Park Avenue, 17th Floor, New York, NY 10016-5997.

G. Maki et al., "A Reconfigurable Data Path Processor," IEEE, Aug. 1991, pp. 18-4.1 to 18-4.4, IEEE, 3 Park Avenue, 17th Floor, New York, NY 10016-5997.

Jacob Davidson, "FPGA Implementation of Reconfigurable Microprocessor," IEEE, Mar. 1993, pp. 3.2.1-3.2.4, IEEE, 3 Park Avenue, 17th Floor, New York, NY 10016-5997.

Christian Iseli et al., "Beyond Superscaler Using FPGA's," IEEE, Apr. 1993, pp. 486-490, IEEE, 3 Park Avenue, 17th Floor, New York, NY 10016-5997.

P.C. French et al., "A Self-Reconfiguring Processor,"; IEEE, Jul. 1993, pp. 50-59, IEEE, 3 Park Avenue, 17th Floor, New York, NY 10016-5997.

Christian Iseli et al., "Spyder: A Reconfigurable VLIW Processor Using FPGA's," IEEE, Jul. 1993, pp. 17-24, IEEE, 3 Park Avenue, 17th Floor, New York, NY 10016-5997.

Michael J. Wirthlin et al., "The Nano Processor: A Low Resource Reconfigurable Processor," IEEE, Feb. 1994, pp. 23-30, IEEE, 3 Park Avenue, 17th Floor, New York, NY 10016-5997.

William S. Carter, "The Future of Programmable Logic and Its Impact on Digital System Design," Apr. 1994, IEEE, pp. 10-16, IEEE, 3 Park Avenue, 17th Floor, New York, NY 10016-5997.

Andre' Dehon, "DPGA-Coupled Microprocessors: Commodity ICs For The Early 21ST Century,"IEEE, Feb. 1994, pp. 31-39, IEEE, 3 Park Avenue, 17th Floor, New York, NY 10016-5997.

Osama T. Albaharna, "Area & Time Limitations of FPGA-Based Virtual Hardware," IEEE, Apr. 1994, pp. 184-189, IEEE, 3 Park Avenue, 17th Floor, New York, NY 10016-5997.

U.S. Appl. No. 10/043,769, filed Jan. 9, 2002, Schulz.

*Xilinx, Inc.*, "The Programmable Logic Data Book," 1994, Revised 1995, Xilinx, Inc., 2100 Logic Drive, San Jose, CA. 95124.

*Xilinx, Inc.*, "The Programmable Logic Data Book," Revised 1995, pp. 2-109 to 2-117, Xilinx, Inc., 2100 Logic Drive, San Jose, CA. 95124.

*Xilinx, Inc.*, "The Programmable Logic Data Book," 1994, Revised 1995, pp. 2-9 to 2-18; 2-187 to 2-199, Xilinx, Inc., 2100 Logic Drive, San Jose, CA. 95124.

*Xilinx, Inc.*, "The Programmable Logic Data Book," 1994, Revised 1995, pp. 2-107 to 2-108, Xilinx, Inc., 2100 Logic Drive, San Jose, CA. 95124.

Christian Iseli et al., "AC++ Compiler for FPGA Custom Execution Units Synthesis," 1995, pp. 173-179, IEEE, 3 Park Avenue, 17th Floor, New York, NY 10016-5997.

*International Business Machines*, "PowerPC 405 Embedded Processor Core User Manual," 1996, 5th Ed., pp. 1-1 to X-16, International Business Machines, 1580 Rout 52, Bldg. 504, Hopewell Junction, NY 12533-6531.

Yamin Li et al., "AIZUP-A Pipelined Processor Design & Implementation on Xilinx FPGA Chip," IEEE, Sep. 1996, pp. 98-106, 98-106, IEEE, 3 Park Avenue, 17th Floor, New York, NY 10016-5997.

Ralph D. Wittig et al., Onechip: An FPGA Processor With Reconfigurable Logic, Apr. 17, 1996, pp. 126-135, IEEE, 3 Park Avenue, 17th Floor, New York, NY 10016-5997.

*Xilinx, Inc.*, "The Programmable Logic Data Book," Jan. 27, 1999, Ch. 3, pp. 3-1 to 3-50, Xilinx, Inc., 2100 Logic Drive, San Jose, CA 95124.

William B. Andrew et al., "A Field Programmable System Chip Which Combines FPGA & Asic Circuitry," IEEE, May 16, 1999, pp. 183-186, IEEE, 3 Park Avenue, 17th Floor, New York, NY 10016-5997.

*Xilinx, Inc.*, "The Programmable Logic Data Book," 2000, Ch. 3 pp. 3-1 to 3-117, Xilinx, Inc., 2100 Logic Drive, San Jose, CA 95124.

U.S. Appl. No. 10/001,871, filed Nov. 19, 2001, Douglass et al.

U.S. Appl. No. 09/991,412, filed Nov. 16, 2001, Herron et al.

U.S. Appl. No. 09/991,410, filed Nov. 16, 2001, Herron et al.

U.S. Appl. No. 09/968,446, filed Sep. 28, 2001, Douglass et al.

*Xilinx, Inc.*, "The Programmable Logic Data Book," 2000, Ch 3, pp. 3-7 to 3-17;3-76 to 3-87, Xilinx, Inc., 2100 Logic Drive, San Jose, CA. 95124.

*International Business Machines*, "Processor Local Bus" Architecture Specifications, 32-Bit Implementation, Apr. 2000, First Edition, V2.9, pp. 1-76, IBM Corporation, Department H83A, P.O. Box 12195, Research Triangle Park, NC 27709.

*Xilinx, Inc.*, Virtex II Platform FPGA Handbook, Dec. 6, 2000, v1.1, pp. 33-75, Xilinx, Inc., 2100 Logic Drive, San Jose, CA. 95124.

U.S. Appl. No. 09/858,732, filed May 15, 2001, Schulz.

U.S. Appl. No. 09/861,112, filed May 18, 2001, Dao et al.

U.S. Appl. No. 09/917,304, filed Jul. 27, 2001, Douglass et al.

Cary D. Snyder and Max Baron; "Xilinx's A-to-Z System Platform"; Cahners Microprocessor; The Insider's Guide to Microprocessor Hardware; Microdesign Resources; Feb. 6, 2001; pp. 1-5.

* cited by examiner

HIGH SPEED CONFIGURABLE TRANSCEIVER ARCHITECTURE

FIELD OF THE INVENTION

The present invention relates to data communication, and more specifically to a configurable high speed transceiver.

BACKGROUND OF THE INVENTION

As a result of improvement in processing technology, it is now possible to put millions of transistors in an integrated circuit. This increases the amount of processing power of the integrated circuit. However, the processing power may be wasted if there are insufficient input-output (I/O) resources to transfer data to and from the integrated circuit. High speed I/O transceivers alleviate this problem by increasing the data transfer speed of the I/O resources. In order to improve performance, circuit designers have started to integrate high speed transceivers into integrated circuits.

Another effect of the increase in the number of transistors is that it is possible to place more circuits in an integrated circuit. This means that the complexity and costs of designing an integrated circuit also increase. As a result, many vendors want to be able to sell the same integrated circuit to different markets. Further, users also like to use the same integrated circuit to support different applications because of the high costs of learning and using a complicated integrated circuit. For example, it is desirable for the same product to support a variety of communication protocols, such as Gigabit Ethernet, XAUI, InfiniBand, Fibre Channel, etc. Consequently, there is a need to have a flexible high speed transceiver that can be used for different purposes.

SUMMARY OF THE INVENTION

The present invention is an integrated circuit that contains a programmable fabric and a plurality of configurable transceivers located at the peripheral of the programmable fabric. The integrated circuit may contain one or more processor cores. The processor core and the transceivers can be connected by a plurality of signal paths that pass through the programmable fabric.

The integrated circuit contains a plurality of configuration memory cells. Some of the cells are associated with the programmable fabric while the others are associated with the configurable transceivers. By turning these cells on or off, users can select the features that are useful to their products.

The above summary of the invention is not intended to describe each disclosed embodiment of the present invention. The figures and detailed description that follow provide additional exemplary embodiments and aspects of the present invention.

DETAILED DESCRIPTION OF THE INVENTION

Figure 1:
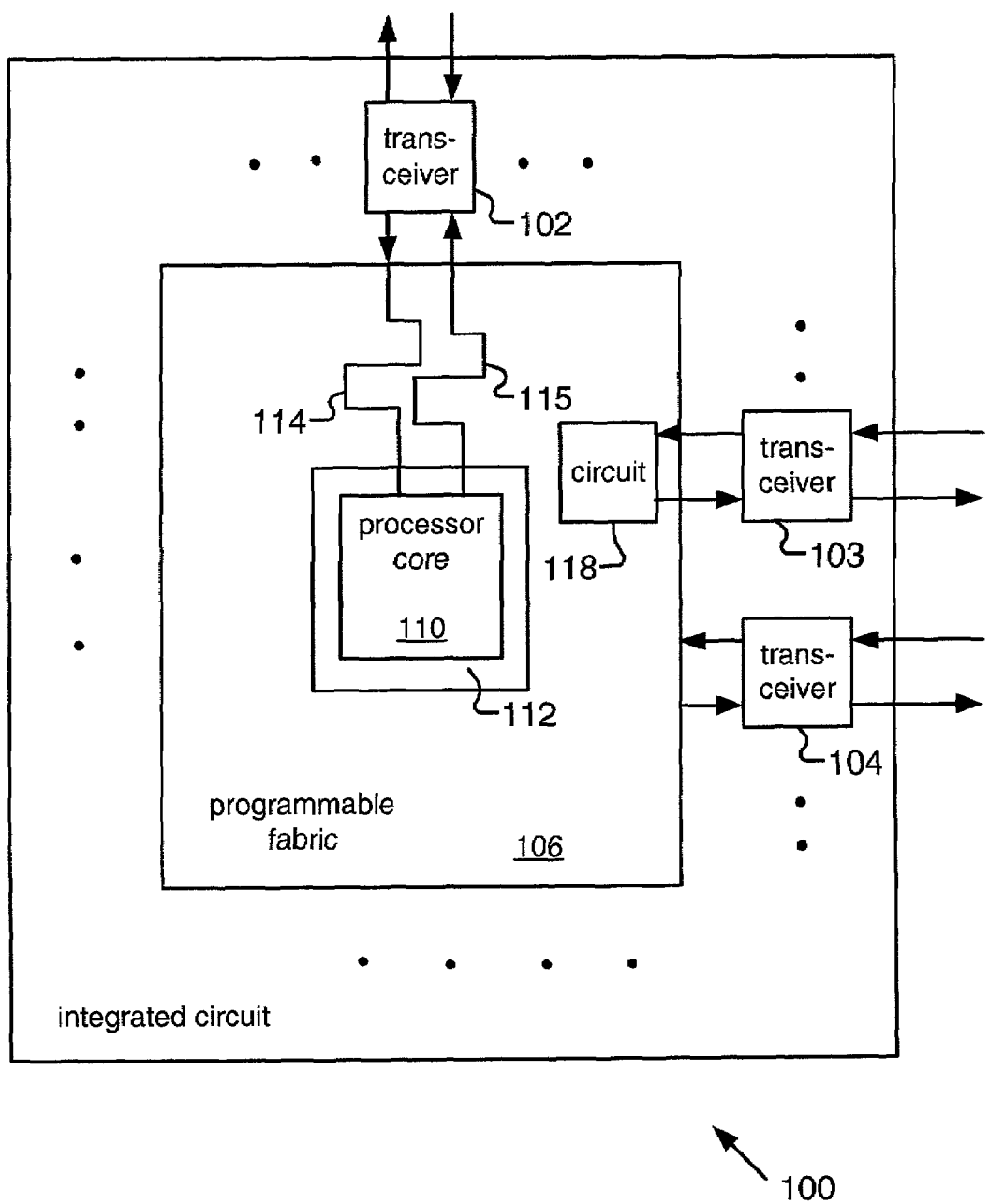
FIG. 1 is a schematic diagram showing an integrated circuit of the present invention.

A schematic diagram showing an integrated circuit 100 of the present invention is shown in FIG. 1. It contains a plurality of transceivers, such as transceiver 102–104, positioned outside of programmable fabric 106. In one embodiment, programmable fabric 106 comprises field programmable gate array (FPGA) fabric. One or more processor cores, such as a processor core 110, can be optionally embedded inside programmable fabric 106. An interface layer 112 is used to facilitate communication between embedded processor core 110 and fabric 106. An example of an interface layer is disclosed in a copending patent application entitled "Programmable Gate Array Having Interconnecting Logic To Support Embedded Fixed Logic Circuitry" (Ser. No. 09/968,446 and filed Sep. 28, 2001). Processor core 110 can be connected to one or more transceivers. In FIG. 1, a pair of routed paths 114–115 are used to schematically show the connection from transceiver 102 to processor core 110 through interface layer 112. Processor core 110 is preferably designed to process data in high speed. Thus, transceivers 102–104 are preferably high speed transceivers.

Processor core 110 can be one of a variety of signal processing devices, such as a microprocessor, network processor, video processor. Note that more than one processor core can be embedded inside programmable fabric 106.

A user may configure a plurality of circuits in programmable fabric 106. Some of these circuits may communicate with transceivers 102–104. For example, FIG. 1 shows a circuit 118 in programmable fabric 106 communicating with transceiver 103.

Figure 2:
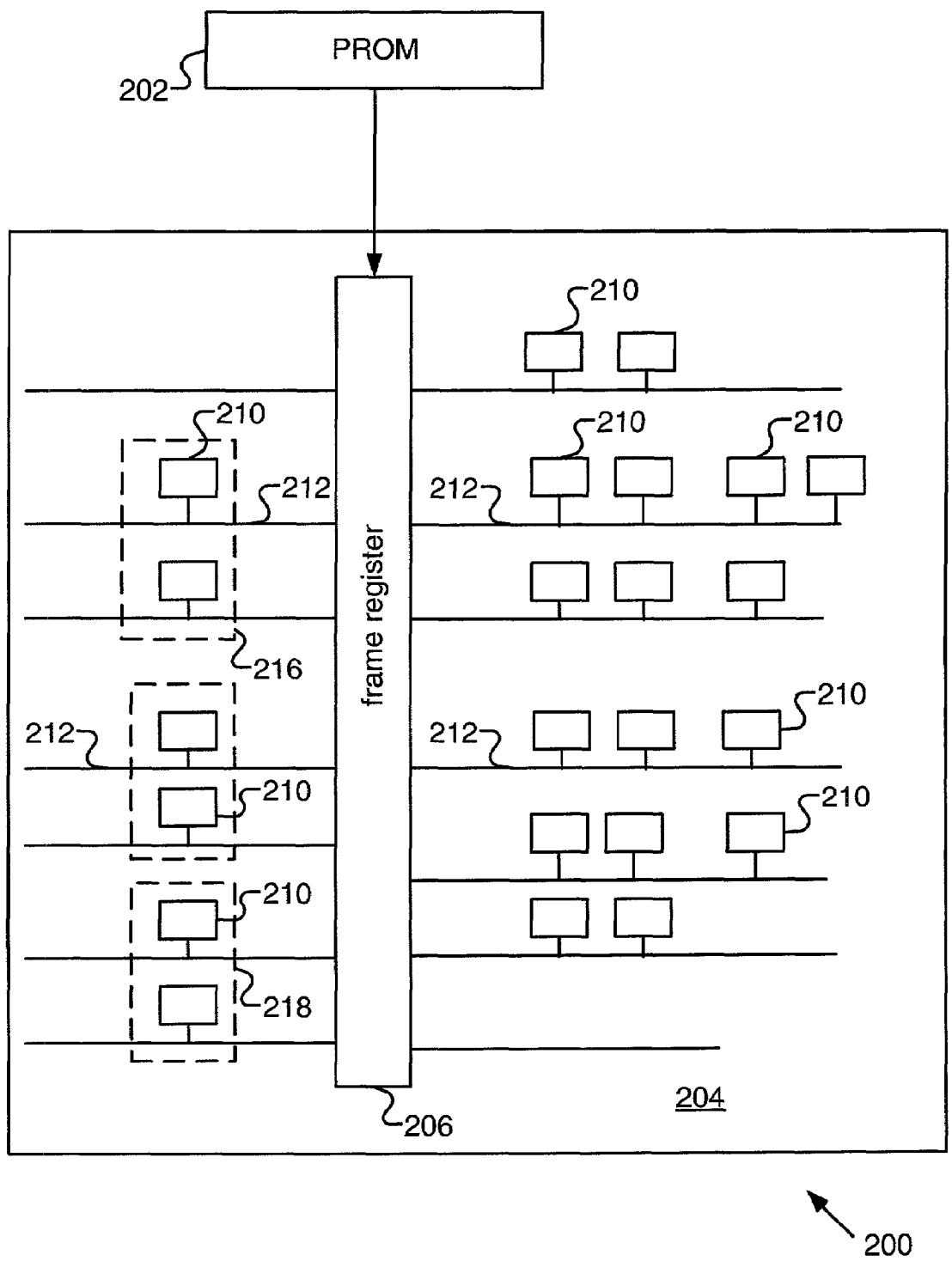
FIG. 2 is a schematic diagram of a system of the present invention.

In the present invention, at least one of the transceivers (in addition to programmable fabric 106) is configurable. FIG. 2 shows a schematic diagram of a system 200 of the present invention showing the configuration of a programmable logic device. System 200 contains a nonvolatile memory (such as a programmable read-only memory 202) that can be used to deliver configuration bitstreams to FPGA 204. FPGA 204 comprises a plurality of configuration memory cells, shown as reference numeral 210, that are connected to a frame register 206 through a plurality of buses, shown as reference numeral 212. These buses allow frame register 206 to set the states of memory cells 210, thereby configuring FPGA 204. Some of the configuration memory cells are used to configure programmable fabric 106, while other configuration memory cells are used to configure the transceivers. For example, configuration memory cells in blocks 216 and 218 are used to configure two separate transceivers, such as transceivers 103 and 104 in FIG. 1. Note that there are typically many configuration memory cells associated with a block.

One difference between programmable fabric 106 and the transceivers 102–104 is that the programmable fabric is intended for implementation of arbitrary logic functions by users (thus the programmable fabric needs to provide almost arbitrary interconnectivity), while the transceiver implements specific functions (high speed serial I/O and associated operations), thus the associated memory cells modify aspects of the operations but not changing the underlying purpose of the circuit. In the programmable fabric, memory cells define logic block functions and interconnections in any desired way to implement any desired logic design. In the transceiver, some memory cells modify the behavior of a given subcomponent, but they do not change the underlying function of that subcomponent. Other memory cells associated with the transceiver modify routing by including or excluding a subcomponent in the transceiver's data path, but they do not alter the general flow of data or the purpose of the data path, that is, to transfer parallel digital data inside the integrated circuit to and from the serial data lines outside the integrated circuit. The advantage of this design is that many of the functions in the transceiver are implemented far more efficiently (higher operating speed, less area and power) than would be possible if they were implemented in the programmable fabric, yet they retain enough flexibility to be of use for a broad range of high speed I/O applications. Some portions of the transceiver are highly specialized and could not be implemented using the programmable fabric or lower speed I/O resources.

In one embodiment, a portion of the transceiver can be configured using the configuration memory cells and another portion can be driven by configured logic in the programmable fabric. It is, of course, possible that the transceiver is controlled entirely by the configuration memory cells.

Figure 3:
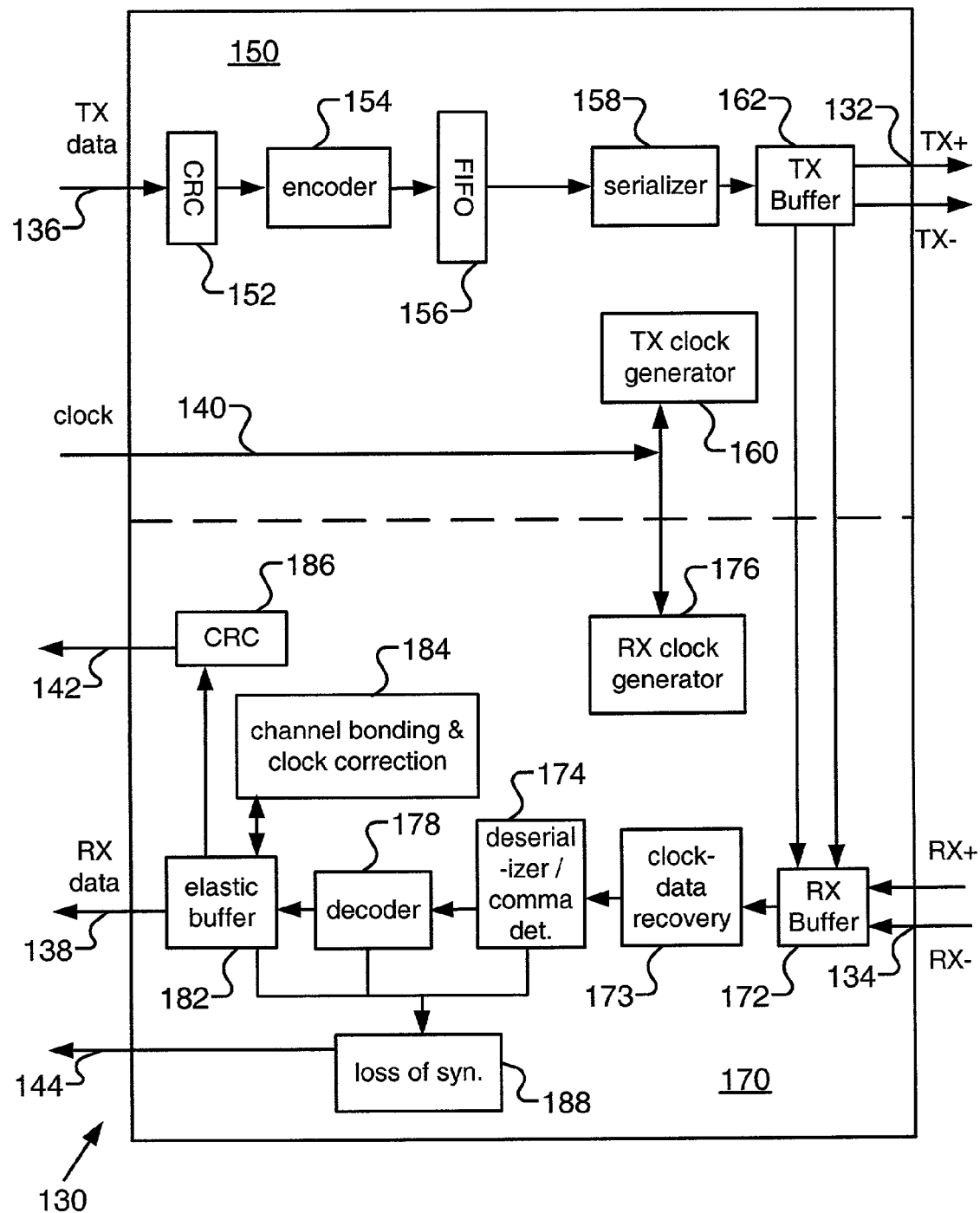
FIG. 3 is a block diagram showing a transceiver design of the present invention.

FIG. 3 is a block diagram showing one transceiver 130 that can be fabricated in integrated circuit 100 of FIG. 1. Transceiver 130 interfaces with an external device (not shown) through an output port 132 that supports differential output signals and an input port 134 that receives differential input signals. Transceiver 130 interfaces with programmable fabric 106 through a transmit data path 136, a receive data path 138, a plurality of clock signals (shown collectively as a signal line 140), a CRC (cyclic redundancy code) status signal 142, and a loss of synchronization signal 144. In one embodiment, the width of the data paths 136 and 138 can be independently configurably selected to be 1, 2 or 4 bytes. This allows engineering trade-offs in programmable fabric 106 between a wide data path with a low clock frequency versus a narrow data path with a high clock frequency. More detailed description of the configurable datapath can be found in a copending patent application entitled "Variable Data Width Operation In Multi-Gigabit Transceivers On A Programmable Logic Device," filed concurrently on Mar. 1, 2002 by Cory et al., patent application Ser. No. 10/090,286. This patent application is incorporated herein by reference.

Note that there may be other signals and subcomponents in a transceiver. Only the most important signals and subcomponents are shown in FIG. 3.

The transmitter side 150 of transceiver 130 is first described. Digital data on data path 136 is processed by a bypassable CRC generator 152. This generator computes and inserts a commonly used 32-bit CRC into the data packets being transmitted. Different protocols handle data in different ways, and CRC generator 152 needs to recognize data packet boundaries so that it can perform CRC computation on appropriate set of data. CRC generator 152 may have the following configuration options:

(a) use or bypass this CRC generator;

(b) a value to use to corrupt the CRC computation in order to test detection of CRC errors in a remote receiver;

(c) a choice of transmission standard to support, e.g., Fibre Channel, Gigabit Ethernet, InfiniBand, or a user defined standard; and (d) for the user defined standard, the start-of-packet and end-of-packet control characters.

More detailed description of CRC generator 152 can be found in a copending patent application entitled "Network Physical Layer with Embedded Multi-Standard CRC Generator," filed concurrently on Mar. 1, 2002 by Sasaki et al., patent application Ser. No. 10/090,519. This patent application is incorporated herein by reference.

The resulted data is delivered to a bypassble encoder 154. In one embodiment, encoder 154 is an 8B/10B encoder. It uses the same 256 data characters and 12 control characters that are used for Gigabit Ethernet, XAUI, Fibre Channel, and InfiniBand. It accepts 8 bits of data along with a K-character signal for a total of 9 bits per character applied. If the K-character signal is "High", the data will be encoded into one of the 12 possible K-characters available in the 8B/10B code. If the K-character input is "Low", the 8 bits will be encoded as standard data. If the K-character input is "High", and a user applies other than one of the pre-assigned combinations, an error signal can be generated. The 8B/10B encoder may be initialized with a user-configured running disparity.

In one embodiment, the programmable fabric may control the following options for encoder 154:

(a) use or bypass this encoder; and (b) modify the maintenance of the running disparity (this can be used to generate data streams with unusual, e.g., intentionally erroneous, running disparity).

The encoded data is delivered to a transmit FIFO buffer 156. This buffer provides a smooth interface between encoder 154, which is controlled by a clock signal generated by the programmable fabric 106 on line 140, and a serializer 158, which is controlled by a reference clock generated by a transmit clock generator 160. These two clock signals are frequency locked, but may not have the same phase. In this embodiment, the reference clock has superior jitter characteristics while the clock signal on line 140 has better clock skew characteristics with respect to other clock signals in programmable fabric 106. Transmit FIFO buffer 156 absorbs phase differences between these two frequency-locked clock signals. In one embodiment, FIFO buffer 156 has a depth of four, and it can detect overflow and under-flow conditions. FIFO buffer 156 may be configured to be used or bypassed in transceiver 130.

The data in FIFO buffer 156 is delivered to serializer 158, which multiplexes parallel digital data to a serial bit stream for transmission over a serial link. The serial bit stream is sent to a transmit buffer 162 that drives the serial bit stream onto a pair of differential serial output connections in output port 132. A configuration option of serializer 158 is to transmit 20 bits (high speed) or 10 bits (low speed) of data per reference clock cycle. More detailed description of this aspect of the invention can be found in a copending patent application entitled "Method And Apparatus For Operating A Transceiver In Different Data Rates," filed concurrently on Mar. 1, 2002 by Cory, patent application Ser. No. 10/090,251. This patent application is incorporated herein by reference.

Turning now to the receiver side 170, transceiver 130 contains a receiver clock generator 176 that generates a reference clock signal for receiver side 170. Transceiver 130 contains a receive buffer 172 that accepts serial data from differential input port 134. The data is fed to a clock-data recovery block 173, which uses transitions on the serial differential input (through input port 134) to determine the frequency and phase of the incoming serial data. This information is used to time the reception of the data. The process is called clock and data recovery. The recovered data is delivered to a deserializer 174, which converts the received serial bit stream into parallel digital data. A configuration option of deserializer 174 is to receive 20 bits (high speed) or 10 bits (low speed) of data per clock cycle.

Deserializer 174 also performs a comma detection function. In some decoding algorithm (such as the 8B/10B encoding), a "comma" is a distinguished pattern that is guaranteed to occur only left-justified within a byte. For example, there are two comma patterns in 8B/10B decoding, a "plus" comma and a "minus" comma. Detection of a comma then serves to define the byte alignment within the received serial bit stream. Configuration options for comma detection can be:

(a) alternative comma definitions;

(b) option to raise asynchronous "comma detect" flag on plus comma only, minus comma only, both, or neither; and (c) option to force comma alignment on half-word boundary.

(d) In one embodiment, programmable fabric 106 may send a signal to control whether the comma detection circuit realigns the byte boundary on recognizing plus comma, minus comma, both, or neither.

The parallel data is then passed to a decoder 178. Decoder 178 decodes digital data that has previously been encoded by a corresponding encoder. Decoder 178 may have the following configuration options:

(a) use or bypass this decoder; and (b) option to raise synchronous "comma" flag (status bit attached to each received byte at the transceiver-programmable fabric interface) on plus comma only, minus comma only, both, or neither. Also option to set this flag for valid commas only (several invalid comma patterns are also possible).

The decoded data is then sent to an elastic buffer 182, which carries out channel bonding and clock correction operations in conjunction with a channel bonding and clock correction controller 184. Elastic buffer 182 may have the following configuration options:

(a) use or bypass the elastic buffer;

(b) use or inhibit clock correction;

(c) threshold value for flagging buffer overflow or underflow; and (d) options related to the operation of the elastic buffer (clock correction and channel bonding), such as the choice of channel bonding modes, the selection of a selectable number of channel bonding sequences of a selectable length matching a selectable byte value (8-bit or 10 bit), and similar selection for clock correction sequences.

The data in elastic buffer 182 is delivered to the programmable fabric through data path 138. The data width can be configurably selected to be 1, 2 or 4 bytes.

Elastic buffer 182 can be optionally connected to a CRC verification block 186. This block verifies the commonly used 32-bit CRC that is expected to appear at the end of received data packets. A signal may be delivered to the programmable fabric on line 142 indicating the result of the verification. In order to perform CRC, verification block 186 should recognize data packet boundaries (similar to CRC generation block 152 described above). CRC Verification block 186 may have the following configuration options:

(a) use or bypass this CRC verification block;

(b) a choice of transmission standard to support, e.g., Fibre Channel, Gigabit Ethernet, InfiniBand, or a user defined standard; and (c) for the user defined standard, the start-of-packet and end-of-packet control characters.

Transceiver 130 can optionally include a loss of synchronization detector 188. It interprets outputs of comma detection 174, decoder 178, and elastic buffer 182 to make a determination of whether the incoming byte stream is in sync. A signal can be delivered to the programmable fabric on line 144. Loss of synchronization detector 188 may have the following configuration options:

(a) use or bypass this detector;

(b) option to set number of invalid characters that cause "loss of sync" status; and (c) option to set the number of valid characters that negates effect of one invalid character for determination of loss of synchronization.

In the event that loss of synchronization detector 188 is bypassed, status information of decoder 178 and elastic buffer 182 may need to be delivered to the programmable fabric using other status lines.

Referring back to FIG. 2, the configuration information on the configurable transceivers of the present invention can be stored in PROM 202. A user can select different options by delivering different configuration bitstreams to FPGA 204.

Those having skill in the relevant arts of the invention will now perceive various modifications and additions which may be made as a result of the disclosure herein. Accordingly, all such modifications and additions are deemed to be within the scope of the invention, which is to be limited only by the appended claims and their equivalents.

The invention claimed is:

1. An integrated circuit comprising:
    a plurality of configuration memory cells;
    programmable fabric circuitry coupled to the plurality of configuration memory cells, wherein the plurality of configuration memory cells are programmable to implement a circuit in the programmable fabric circuitry;
    a plurality of transceivers containing respective components having selectable values, said components being configured by said plurality of configuration memory cells, wherein one of said components is a loss of synchronization detector;
    wherein each configurable transceiver includes a configurable serializer and a configurable deserializer coupled to at least one of the configuration memory cells, wherein each serializer is configurable to transmit data at a selected bit rate, and each deserializer is configurable to receive data at the selected bit rate;
    wherein each transceiver has an input port that receives differential input signals and an output port that outputs differential output signals; and
    a plurality of signal paths coupling each configurable transceiver to a circuit implemented in the programmable fabric circuitry, at least a portion of each of said signal paths passing through said programmable fabric circuitry.

2. The integrated circuit of claim 1 wherein one of said components is a cyclic redundancy code generator.

3. The integrated circuit of claim 1 wherein one of said components is a cyclic redundancy code verification block.

4. The integrated circuit of claim 1 wherein said deserializer further comprises configurable comma detection function.

5. The integrated circuit of claim 1 wherein one of said components is an elastic buffer.

6. The integrated circuit of claim 1 further comprising:
    a programmable fabric; and
    at least one signal generated by said programmable fabric for controlling said values of said components.

7. The integrated circuit of claim 6 wherein one of said components is an encoder, and said at least one signal controls said encoder.

8. An integrated circuit comprising:
a programmable fabric;
a processor core surrounded by said programmable fabric;
a plurality of configurable transceivers located at the peripheral of said programmable fabric, wherein at least one of said configurable transceivers comprises a loss of synchronization detector;
wherein each transceiver has an input port that receives differential input signals and an output port that outputs differential output signals; and
wherein each configurable transceiver includes a configurable serializer and a configurable deserializer, wherein each serializer is configurable to transmit data at a selected bit rate, and each deserializer is configurable to receive data at the selected bit rate;
a plurality of signal paths connecting at least one of said configurable transceivers and said processor core, at least a portion of each of said signal paths passing through said programmable fabric.

9. The integrated circuit of claim 8 further comprising a plurality of configuration memory cells, and wherein some of said memory cells are associated with said configurable transceivers.

10. The integrated circuit of claim 9 wherein at least one of said configurable transceivers comprises a cyclic redundancy code generator and a cyclic redundancy code verification block.

11. The integrated circuit of claim 8 wherein said deserializer further comprises configurable comma detection function.

12. The integrated circuit of claim 9 wherein at least one of said configureable transceivers comprises an elastic buffer.

13. The integrated circuit of claim 8 wherein said programmable fabric generates at least one signal for controlling at least one of said configurable transceivers.

14. The integrated circuit of claim 13 wherein at least one of said configurable transceivers comprises an encoder, and said at least one signal controls said encoder.

15. An integrated circuit, comprising:
programmable fabric circuitry, including a plurality of configuration memory cells that are programmable to implement a circuit in the programmable fabric circuitry;
a processor core disposed on the integrated circuit, wherein the programmable fabric circuitry is configurable to couple to the processor core;
a plurality of configurable transceivers located at the periphery of the programmable fabric, each configurable transceiver including a configurable serializer and a configurable deserializer coupled to at least one of the configuration memory cells, wherein each serializer is configurable to transmit data at a selected bit rate, and each deserializer is configurable to receive data at the selected bit rate; and
a plurality of signal paths coupling at least one of said configurable transceivers to the processor core, at least a portion of each of said signal paths passing through said programmable fabric circuitry.

16. The integrated circuit of claim 15, wherein each deserializer detects commas in received data and is configurable to detect one of at least two different definitions of a comma.

17. The integrated circuit of claim 15, wherein at least one of said configurable transceivers comprises a loss of synchronization detector.

* * * * *